(No Model.) 2 Sheets—Sheet 1.

W. BIRCH.
APPARATUS FOR SEPARATING SOLIDS FROM SLUDGE.

No. 514,300. Patented Feb. 6, 1894.

Witnesses.
James Gracir
George Baumann

Inventor.
William Birch
By his Attorneys
Howson and Howson

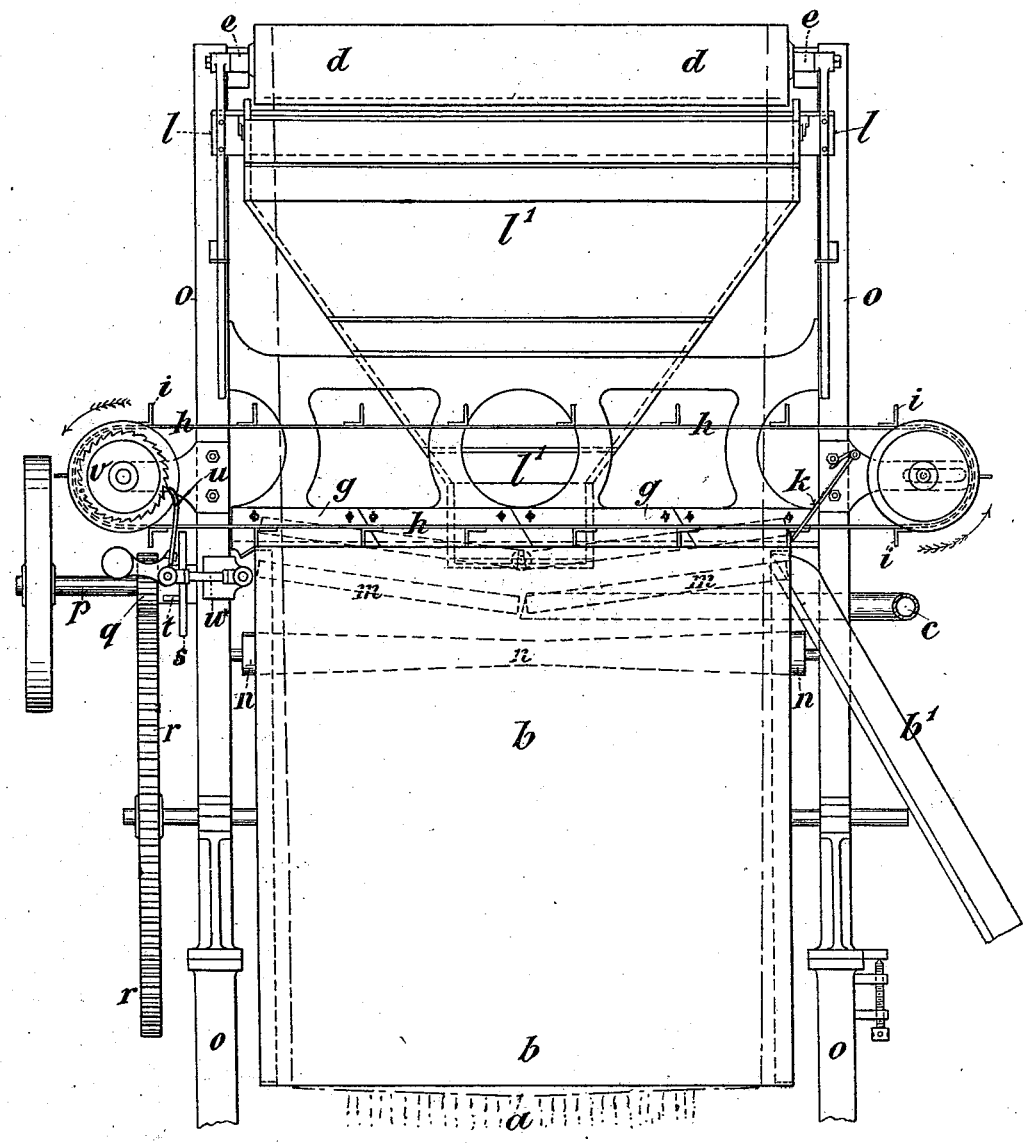

UNITED STATES PATENT OFFICE.

WILLIAM BIRCH, OF MANCHESTER, ENGLAND.

APPARATUS FOR SEPARATING SOLIDS FROM SLUDGE.

SPECIFICATION forming part of Letters Patent No. 514,300, dated February 6, 1894.

Application filed October 17, 1892. Serial No. 449,153. (No model.)

*To all whom it may concern:*

Be it known that I, WILLIAM BIRCH, a subject of the Queen of Great Britain and Ireland, residing at Lower Broughton, Manchester, in the county of Lancaster, England, have invented Improved Means and Apparatus for Separating Solid or Semi-Solid Substances from Sludge or other Fluid or Semi-Fluid Matters, of which the following is a specification.

This invention relates principally to means or apparatus adapted for the purpose of dealing with the sludge which is removed from the settling tanks employed in the purification of sewage, and other fluid or semi-fluid matters for the purpose of separating the fluid portion therefrom, and reducing the more solid portion thereof to a semi-dry or pasty state, so that it can be handled or removed by spades or similar implements but the said invention is also equally applicable to other cases where it is required to separate the fluid and solid portions of any kind of sludge in a similar manner.

The nature of my said invention and the manner in which the same is to be performed or carried into practical effect will be readily understood on reference to the sheet of drawings hereunto annexed and the following explanation thereof.

Figure 1:
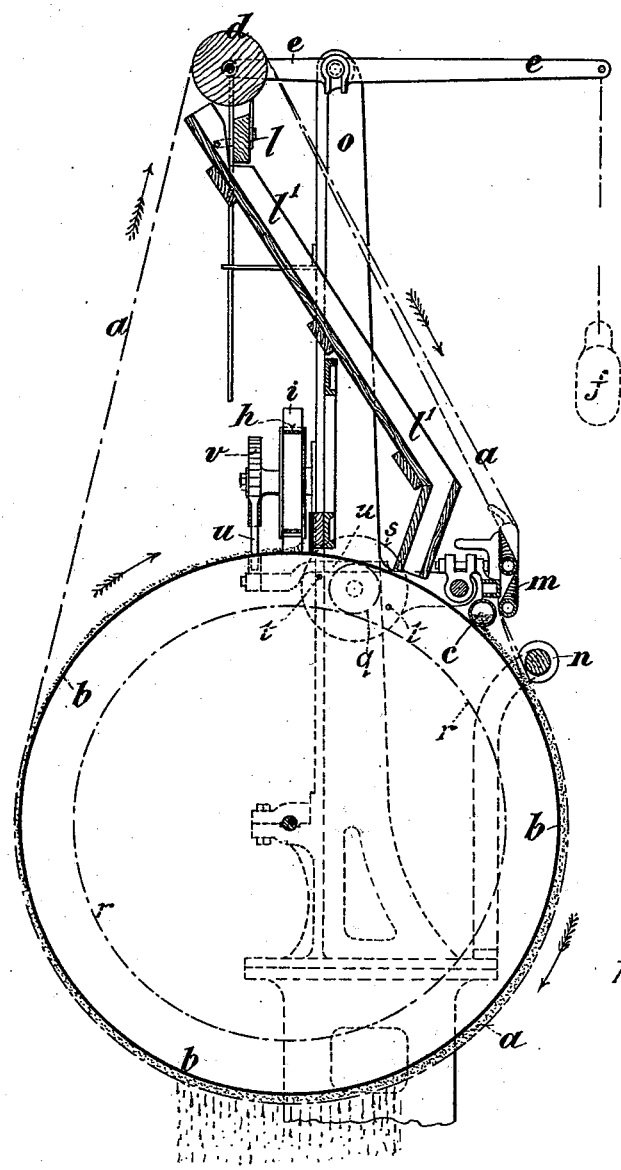
Figure 3:
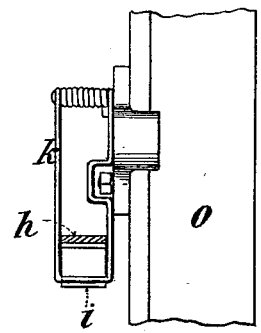
Figure 4:
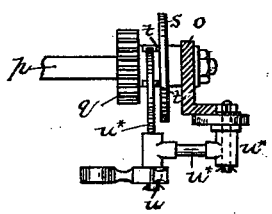

Figure 1 on the drawings is a vertical section and Fig. 2 a front elevation of the improved apparatus which I propose to employ for the purposes of my invention. Fig. 3 shows a detached part, hereinafter more particularly referred to, drawn to a larger scale. Fig. 4 is a detail view.

The principal novel feature of my invention consists in the use for such purpose of an endless traveling band $a$ (see Fig. 1) of porous woven cloth or fabric, passing round and tensioned or stretched against a revolving drum $b$, between the adjacent surfaces of which the "sludge" is admitted or fed (preferably by an intermittent pump) through a feed pipe $c$, no external pressure being used other than the tension of the endless cloth or fabric $a$, which forms a kind of filtering bar through which the more fluid portion passes while the solid matters are retained thereby. For this purpose the drum has a peripheral surface against which the material can be squeezed or pressed by the tensioned or stretched filtering band. The tension is given to the endless band of cloth $a$ by its passing over a roller $d$ above the drum $b$ the axles of which roller $d$ are supported by levers $e$ provided with a weight $f$ or a spring (preferably adjustable) whereby the tension of the traveling cloth or band $a$ is regulated to such a degree that the edges thereof shall travel in contact with the drum $b$ (or nearly so) while the weight of the "sludge" will draw down the central part into a kind of bag, the tension of the cloth $a$ giving so much pressure as to squeeze the water or fluid through the same while retaining the more solid portion. The endless cloth $a$ is of a thin porous nature so that it does not become clogged or silted up with the solid matter, but the latter becomes "caked" onto the surface of the drum $b$. Fitting against the upper part of this drum $b$ is a scraper or "doctor" $g$ (preferably in sections as shown at Fig. 2) which clears the solid matter off the surface of the drum $b$ and at the point where it accumulates in front of this scraper or "doctor" $g$ I arrange an endless band $h$ fitted with short scrapers $i$ traveling transversely, that is, in a direction parallel to the axis of the drum $b$ and the action of these traveling scrapers $i$ removes the solid matter and delivers it over the end of the drum $b$ on to a trough or chute $b'$, a light spring wire $k$ (see also detached side view Fig. 3) being provided at this end of the drum to act as a cleaner and remove the solid matter which adheres to the faces of the traveling scrapers $i$ and to the endless band $h$ so as to prevent the spaces between the scrapers $i$ from being clogged. It will be evident that as soon as one of the scrapers $i$ comes against the wire $k$ (see Fig. 2) it will carry it along and as the wire $k$ is thus brought into a more perpendicular position it will clear the face of the scraper $i$ and as the latter continues to advance the bend of the wire $k$ will pass over the edge of the scraper and fall against the surface of the endless traveling band $h$ which it will clean, and so on alternately. The water or effluent liquid passing through the traveling cloth or filtering bag $a$ is received into a trough beneath (not shown on the drawings) from whence it is conveyed away back to the settling tank or elsewhere.

Beneath the top roller $d$ I arrange a scraper or "doctor" $l$ and a sloping board $l'$ (or other equivalent means) to catch the sludge and drip water from this roller and prevent it from falling direct onto the drum $b$ and its lower edge carries the said sludge and drip water back and discharges it on the return side between the traveling cloth or band $a$ and the descending surface of the drum $b$. To this traveling band or cloth $a$ on the return side I apply a swiveling angular roller guide $m$ for the purpose of keeping the cloth central on the drum, and for smoothing out creases and keeping it straight, and to assist it in assuming the curved or bag-like form I employ a roller $n$ which I make slightly concave in its longitudinal direction that is, smaller in diameter toward the center and gradually larger toward its ends.

The various devices above-named are supported by a suitable framework $o$ and may be driven by any convenient means.

In the arrangement shown on the drawings the driving shaft $p$ has a spur pinion $q$ keyed upon it driving a large spur wheel $r$ fixed on the axle of the drum $b$ thus giving it a slow revolving motion. On the driving shaft $p$ is also keyed a disk or face plate $s$ having a pin $t$ which at each revolution actuates a cranked lever $u^x$ pivoted to the frame $o$ and to which is pivoted a ratchet lever or catch $u$ which acts upon the teeth of a ratchet wheel $v$ fixed on the axle of one of the drums round which the endless scraper band $h$ passes.

I claim—

1. The improved means or apparatus for separating solid or semi-solid substances from "sludge" or other fluid or semi-fluid matters, comprising a revolving drum, having a surface against which the material may be pressed, an endless filtering band around the drum and adapted to travel therewith means consisting of stretching or tensioning devices to cause the said endless band to press the material against the surface of the drum without any external pressure other than the tension of the band itself, means for delivering sludge between the surface of the drum and the band and transversely moving scrapers to remove the solid material from the surface of the drum and deliver it over the end of the same, substantially as and for the purposes set forth.

2. In a sludge separating apparatus, the combination of a revolving drum having a surface against which the material may be pressed, a guide roller and an endless filtering band passing around the guide roller and the drum and adapted to travel with the latter, with means for delivering the sludge between the surface of the drum and the band, means consisting of stretching or tensioning devices to cause the endless band to press the material against the surface of the drum, without any external pressure other than the tension of the band itself, and transversely moving scrapers to remove the solid material from the surface of the drum and deliver it over the end of the same, substantially as and for the purpose set forth.

3. In a sludge separating apparatus the combination of a revolving drum and an endless porous cloth or fabric acting as a filtering bag, with means for accumulating the solid matter on the revolving drum, and an endless band of scrapers acting transversely to remove the solid material from the surface of the drum and deliver it over the end of same.

4. In a sludge separating apparatus the combination of a revolving drum, an endless porous cloth or fabric acting as a filtering bag, means for delivering the sludge between the surfaces of the drum and the cloth, and a roller above to give tension to the traveling cloth or fabric, with a scraper or "doctor" to act on the said roller and a sloping board to catch the sludge and drip water from the same and deliver it between the drum and the endless cloth on the return side.

5. In a sludge separating apparatus the combination of a revolving drum, and an endless porous cloth or fabric passing partly around the drum and acting as a filtering bag, with a guide to keep the same central on the drum, a roller concave toward the center to assist the endless cloth or fabric to assume a bag-like form at its central part while the edges thereof are in contact with the drum, and means for delivering the sludge into the space thus formed between the surface of the drum and the cloth all substantially as set forth.

In testimony whereof I have signed my name to this specification in the presence of two subscribing witnesses.

WILLIAM BIRCH.

Witnesses:
GEORGE DAVIES,
JNO. HUGHES.